(12) United States Patent
Saendig (10) Patent No.: US 9,395,176 B2
(45) Date of Patent: Jul. 19, 2016

(54) OPTICAL POSITION-MEASURING DEVICE (71) Applicant: DR. JOHANNES HEIDENHAIN GmbH, Traunreut (DE)

(72) Inventor: Karsten Saendig, Palling (DE)

(73) Assignee: DR. JOHANNES HEIDENHAIN GMBH, Traunreut (DE)

(*) Notice: Subject to any disclaimer, the term of this patent is extended or adjusted under 35 U.S.C. 154(b) by 102 days.

(21) Appl. No.: 14/155,447

(22) Filed: Jan. 15, 2014

(65) Prior Publication Data
US 2014/0218746 A1  Aug. 7, 2014

(30) Foreign Application Priority Data

Feb. 6, 2013 (DE) .......................... 10 2013 201 904
Nov. 5, 2013 (DE) .......................... 10 2013 222 383

(51) Int. Cl.
*G01B 11/02* (2006.01)
*G01B 11/14* (2006.01)
*G01D 5/26* (2006.01)
*G01D 5/38* (2006.01)

(52) U.S. Cl.
CPC ............... *G01B 11/14* (2013.01); *G01D 5/266* (2013.01); *G01D 5/268* (2013.01); *G01D 5/38* (2013.01)

(58) Field of Classification Search
CPC .... G01B 11/14; G01B 2290/30; G01D 5/266; G01D 5/268; G01D 5/38

USPC .......................................................... 356/498
See application file for complete search history.

(56) References Cited

U.S. PATENT DOCUMENTS

| 5,424,833 | A | 6/1995 | Huber et al. | |
|---|---|---|---|---|
| 6,528,779 | B1 | 3/2003 | Franz et al. | |
| 7,235,776 | B2 | 6/2007 | Mayer et al. | |
| 7,701,593 | B2 | 4/2010 | Holzapfel et al. | |
| 2008/0297809 | A1* | 12/2008 | Holzapfel et al. | 356/614 |
| 2011/0235051 | A1* | 9/2011 | Huber et al. | 356/499 |
| 2011/0299093 | A1* | 12/2011 | Ishizuka et al. | 356/498 |

FOREIGN PATENT DOCUMENTS

DE  102007024349 A1  11/2008

* cited by examiner

*Primary Examiner* — Tarifur Chowdhury
*Assistant Examiner* — Jonathon Cook
(74) *Attorney, Agent, or Firm* — Leydig, Voit & Mayer, Ltd.

(57) ABSTRACT

The present invention relates to an optical position-measuring device for generating a plurality of phase-shifted scanning signals regarding the relative position of a fiber optic scanning head and a reflection measuring standard movable relative thereto in at least one measuring direction. In the fiber optic scanning head, a scanning reticle is disposed before the measuring standard end of an optical fiber. The scanning signals are coded in a wavelength-dependent manner. To this end, a beam incident on the scanning reticle is split into at least two sub-beams which strike the reflection measuring standard and are subsequently recombined to interfere with each other so as to generate the phase-shifted scanning signals. The sub-beams travel different optical path lengths between splitting and recombination.

21 Claims, 5 Drawing Sheets

OPTICAL POSITION-MEASURING DEVICE

CROSS-REFERENCE TO PRIOR APPLICATIONS

Priority is claimed to German Patent Application No. DE 10 2013 201 904.1, filed on Feb. 6, 2013, and to German Patent Application No. DE 10 2013 222 383.8, filed on Nov. 5, 2013, the entire disclosure of each of these applications is hereby incorporated by reference herein.

FIELD

The present invention relates to an optical position-measuring device for generating a plurality of phase-shifted scanning signals regarding the relative position of a fiber optic scanning head and a reflection measuring standard movable relative thereto in at least one measuring direction, the fiber optic scanning head having a scanning reticle disposed therein before the measuring standard end of an optical fiber, and the phase-shifted scanning signals being coded in a wavelength-dependent manner.

BACKGROUND

Optical position-measuring devices include a measuring standard and a scanning unit moveable relative thereto. The scanning unit typically contains a light source, optoelectronic detector elements, as well as additional optical components such as lenses, gratings, etc. However, a scanning unit having all these components may be too large in size for certain applications. Furthermore, in certain applications, the active components of such a scanning unit may be undesirably affected by electromagnetic interference fields or increased temperatures. Moreover, electrical power dissipated by the light source may cause a thermal effect on the measurement accuracy.

Therefore, solutions for optical position measuring devices have become known, in which only the scanned measuring standard as well as a passive fiber optic scanning head movable relative thereto are disposed at the actual measurement location. The other active components that are relevant for the scanning operation, such as the light source and optoelectronic detector elements, are disposed at a distance from the measurement location and connected to the fiber optic scanning head by optical fibers. In this way, it is possible to achieve an extremely compact system at the actual measurement location. Moreover, it is also possible to minimize interference effects on the various active components on the scanning side.

A position-measuring device of this type has been proposed, for example, in the Applicant's German Patent Application DE 10 2007 024 349 A1. The position-measuring device disclosed in this publication includes a measuring standard in the form of a reflection measuring standard and, in addition, a fiber optic scanning head movable relative thereto in at least one measuring direction. Additional components of the position-measuring device are disposed downstream of the fiber optic scanning head at a distance therefrom and connected by a suitable optical fiber. These components include, for example, the light source required for optical scanning, a plurality of optoelectronic detector elements, and possibly further active components for signal generation and processing. The purely passive fiber optic scanning head includes substantially a scanning reticle and the end of an optical fiber for delivering illumination and for returning the signal-generating beams of light. In order to generate a plurality of phase-shifted scanning signals, provision is made for wavelength-dependent coding of the scanning signals. To this end, the scanning reticle is illuminated with broadband light, and the scanning reticle is formed by a plurality of elementary cells, each composed of a plurality of regions which are transparent to different wavelength ranges of the illumination spectrum. To this end, the different regions of each elementary cell of the scanning reticle are designed, for example, as partial etalons having different transmission wavelengths. The scanning principle used in DE 10 2007 024 349 A1, however, cannot be used in conjunction with reflection measuring standards having very small grating periods. The reason for this is that the size of partial etalons cannot be made arbitrarily small while at the same time retaining their wavelength-dependent transmission.

SUMMARY

In an embodiment, the present invention provides an optical position-measuring device, comprising an optical fiber, a fiber optic scanning head having a scanning reticle disposed therein before a measuring standard end of the optical fiber and a reflection measuring standard movable relative to the fiber optic scanning head in at least one measuring direction. The optical position-measuring device is configured to generate a plurality of phase-shifted scanning signals regarding a position of the fiber optic scanning head relative to the reflection measuring standard. The phase-shifted scanning signals are coded in a wavelength-dependent manner. The scanning reticle is configured such that: a beam incident on the scanning reticle is split into at least two sub-beams which strike the reflection measuring standard and are subsequently recombined to interfere with each other so as to generate the phase-shifted scanning signals, and the sub-beams travel different optical path lengths between splitting and recombination.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides an optical position-measuring device having a passive fiber optic scanning head via which high-resolution position measurements can be made.

The optical position-measuring device of the present invention, in an embodiment, is used for generating a plurality of phase-shifted scanning signals regarding the relative position of a fiber optic scanning head and a reflection measuring standard movable relative thereto in at least one measuring direction. In the fiber optic scanning head, a scanning reticle is disposed before the measuring standard end of an optical fiber and the phase-shifted scanning signals are coded in a wavelength-dependent manner.

The scanning reticle is configured in such a way that
 a beam incident on the scanning reticle is split into at least two sub-beams which strike the reflection measuring standard and are subsequently recombined to interfere with each other so as to generate the phase-shifted scanning signals, and
 the sub-beams travel different optical path lengths between splitting and recombination.

In an advantageous embodiment, the scanning reticle is further configured such that at least two sub-beams propagate symmetrically with respect to a normal to the scanning reticle between the scanning reticle and the reflection measuring standard and strike the reflection measuring standard at its Littrow angle.

Preferably, the diffraction efficiency of the reflection measuring standard used is maximum in the +/−1st diffraction orders.

Provision may be made for the optical fiber to be in the form of a multi-mode fiber via which both the beam used for illumination can be transmitted toward the fiber optic scanning head and the recombined sub-beams can be transmitted away from the fiber optic scanning head.

Moreover, at the end of the optical fiber facing away from the measuring standard, there may be disposed
 a spectrally broadband light source or
 a plurality of light sources emitting radiation of different wavelengths, the radiation of which can be coupled via an input coupling device into the optical fiber as an illumination beam.

At the end of the optical fiber facing away from the measuring standard, there may also be disposed a detector device including
 a splitting device for wavelength-dependent separation of the recombined sub-beams, as well as
 a plurality of optoelectronic detector elements capable of receiving the separated sub-beams and converting the detected sub-beams into phase-shifted electrical scanning signals.

Preferably, the scanning reticle is configured as a plate-like transparent substrate, where
 the side of the scanning reticle facing the optical fiber is provided with a first transmission grating that splits the beam incident thereon into at least two diffracted sub-beams which propagate further asymmetrically with respect to a normal to the scanning reticle, and
 the side of the scanning reticle facing the reflection measuring standard is provided with a second transmission grating that causes the sub-beams incident thereon from the first transmission grating to be deflected in such a way that they propagate symmetrically relative to each other with respect to a normal to the scanning reticle between the scanning reticle and the reflection measuring standard and strike the reflection measuring standard at its Littrow angle.

Advantageously, the first and second transmission gratings are each configured as a blazed phase grating.

It may be provided that the first and second transmission gratings have a periodic phase pattern along the measuring direction.

Furthermore, the first transmission grating may be configured such that it produces a collimating effect on the beam incident thereon.

Preferably, the thickness of the scanning reticle and/or the grating parameters of the transmission gratings provided thereon is/are suitably selected to enable multiple scanning of the signal components that contribute to the phase-shifted scanning signals.

In another embodiment, it may be provided that a linearly polarized beam is incident on the scanning reticle, and that
 the side of the scanning reticle facing the optical fiber is provided with a first transmission grating that splits the beam incident thereon into at least two diffracted sub-beams, and
 the side of the scanning reticle facing the reflection measuring standard is provided with a birefringent element, in which the split sub-beams propagate further asymmetrically with respect to a normal to the scanning reticle and, after exiting the scanning reticle, they propagate symmetrically relative to each other with respect to a normal to the scanning reticle between the scanning reticle and the reflection measuring standard and strike the reflection measuring standard at the Littrow angle.

Advantageously, the thickness of the birefringent element is suitably selected to enable multiple scanning of the signal components that contribute to the phase-shifted scanning signals.

Moreover, provision may be made for the splitting device to include a plurality of diffraction gratings arranged in series in the optical path.

Furthermore, the end of the optical fiber facing away from the measuring standard may be provided with an antireflection coating and/or be angle-polished.

With the optical position-measuring device of the present invention, it is now also possible to perform high-resolution position measurements via a passive fiber optic scanning head; i.e., reflection measuring standards having very small grating periods can be scanned by means of the fiber optic scanning head.

Another advantage to be mentioned is that, due to the symmetrical paths of split sub-beams between the fiber optic scanning head and the reflection measuring standard, the system is highly insensitive to variations in the scanning distance. In particular, the read position is independent of the scanning distance.

In addition, the passive fiber optic scanning head of the optical position-measuring device of the present invention has a particularly simple and very compact design.

In the following, a first exemplary embodiment of the position-measuring device according to the present invention will be described with reference to FIGS. 1, 2a and 2b.

The optical position-measuring device of the exemplary embodiment shown includes a linear reflection measuring standard 10 which is movable relative to a fiber optic scanning head 20 at least in the indicated measuring direction x. In this connection, either reflection measuring standard 10 may be stationary and fiber optic scanning head 20 may be movable or reflection measuring standard 10 may be movable and fiber optic scanning head 20 may be stationary. Reflection measuring standard 10 and fiber optic scanning head 20 are connected to two objects, which are movable relative to one another in measuring direction x and whose position relative to each other is to be determined. These objects may, for example, be moving machine components whose relative position must be determined. The position-dependent scanning signals generated by the position-measuring device are fed to subsequent electronics, which can then suitably control the position of these components.

The reflection measuring standard 10 of the exemplary embodiment shown is in the form of a linear reflection phase grating, which is scanned under the incident light from fiber optic scanning head 20. Reflection measuring standard 10 is formed by graduation regions which are periodically arranged along measuring direction x and have different phase-shifting effects. The graduation regions are rectangular in shape, the longitudinal axes of the rectangles extending in the indicated y-direction, which is oriented perpendicular to measuring direction x in the plane of the measuring standard.

As an alternative to the embodiment shown, a rotary reflection measuring standard in the form of a radial or cylindrical graduation can, of course, also be used in the position-measuring device of the present invention.

Illumination of reflection measuring standard 10 is provided by an illumination beam delivered via an optical fiber 30. To this end, a spectrally broadband light source 40 is disposed at the end of optical fiber 30 facing away from the measuring standard, and the radiation of this light source is coupled into optical fiber 30 via an input coupling device in the form of a collimator lens 41, a beam splitter 42, and an input coupling lens 43. A suitable light source 40 having a sufficiently broad emission spectrum may be provided, for example, by an infrared LED emitting at a central wavelength of 850 nm and having a spectral width of 60 nm.

The active surface of light source 40 is imaged via the arrangement shown onto the input coupling face of optical fiber 30 in a ratio equal to that of the focal lengths of input coupling lens 43 and collimator lens 41. The imaging ratio is to be optimized for maximum possible light input into optical fiber 30.

In addition to light source 40, a detector device 50 is provided at the end of optical fiber 30 facing away from the measuring standard. This detector generates a plurality of phase-shifted scanning signals from the superimposed sub-beams received. The sub-beams that are reflected back from reflection measuring standard 10 and superimposed are delivered to detector device 50 through optical fiber 30. For details on the design of detector device 50, reference is made to the following description. From detector device 50, the displacement-dependent scanning signals are fed to subsequent electronics, which uses them for purposes of controlling the position of the objects that are movable relative to one another.

Thus, the various active components of the position-measuring device of the present invention, such as, in particular, light source 40 and detector device 50, are disposed at a distance from the actual measurement location and optically coupled thereto only by optical fiber 30. In this way, firstly, interference effects on these components are minimized and, secondly, the passive fiber optic scanning head 20 at the measurement location can be made very compact.

Optical fiber 30 preferably takes the form of a multi-mode fiber via which both the beam used for illumination can be transmitted toward reflection measuring standard 10 and the superimposed sub-beams used for detection can be transmitted away from reflection measuring standard 10 toward detector unit 50.

Figure 1:
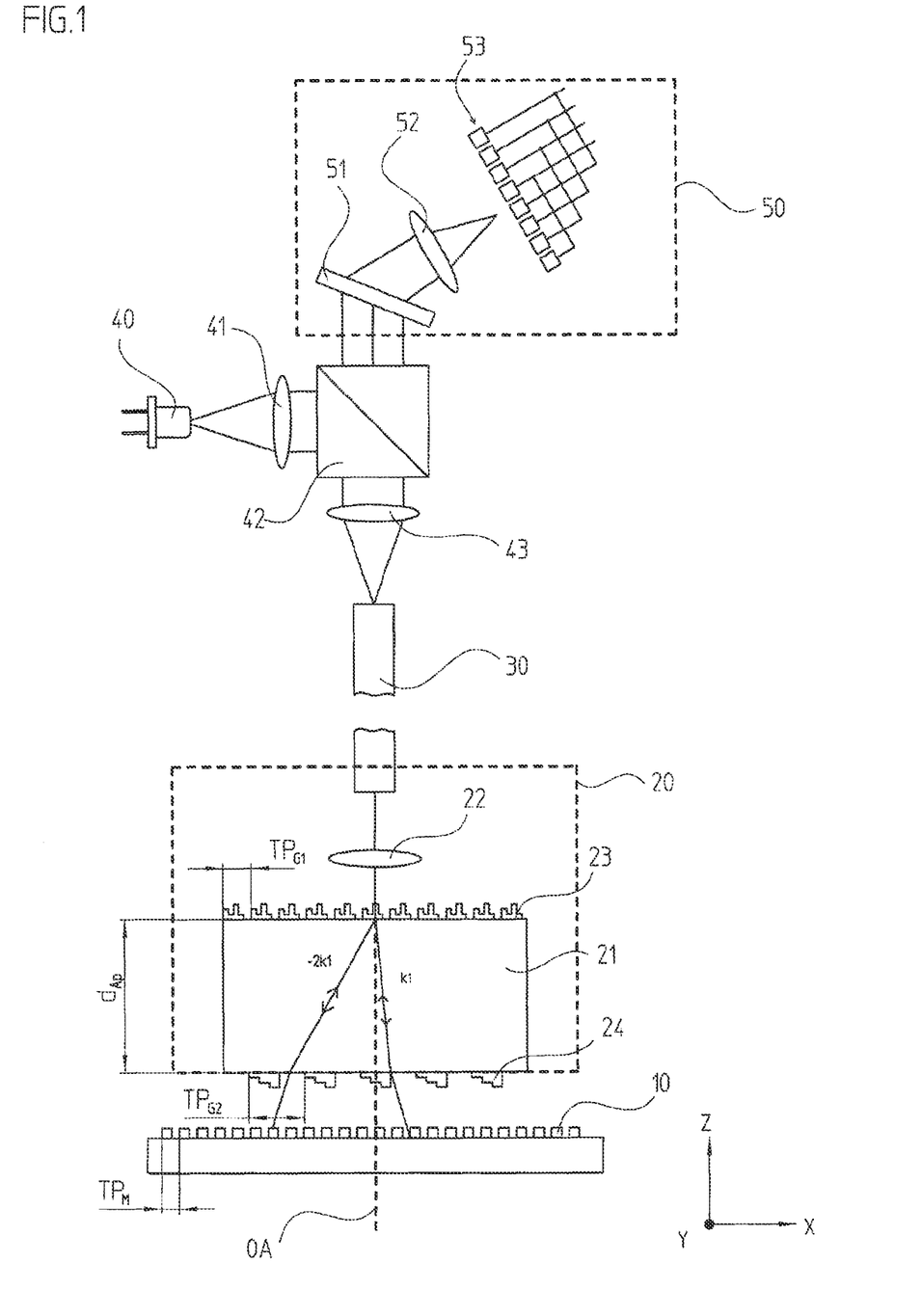
FIG. 1 is a schematic view of a first exemplary embodiment of the position-measuring device according to the present invention.
Figure 2A:
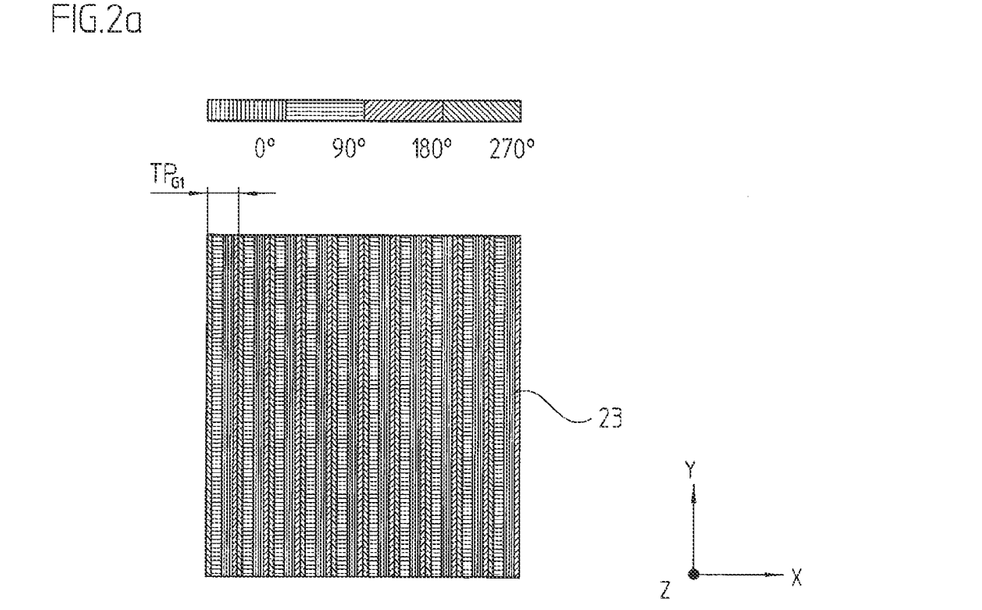
FIGS. 2a, 2b each show in schematic form the phase pattern of the first and second transmission gratings on the top side and the underside of the scanning reticle of the first exemplary embodiment.
Figure 2B:
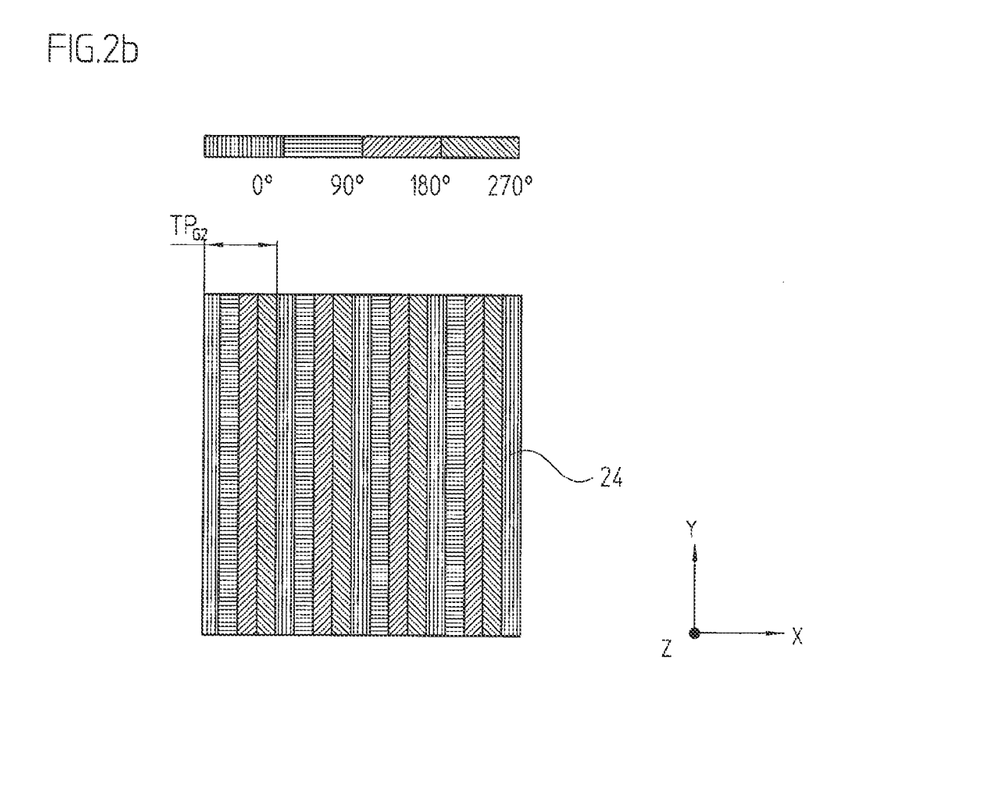

In the present exemplary embodiment, as is apparent from FIG. 1, fiber optic scanning head 20 includes a scanning reticle 21 disposed before the measuring standard end of optical fiber 30, as well as a refractive optical element in the form of a lens 22. Lens 22 is disposed in fiber optic scanning head 20 between optical fiber 40 and scanning reticle 21. Lens 22 collimates the incident beam from the output face of the optical fiber on its way to reflection measuring standard 10 along optical axis OA and causes the sub-beams incident thereon from reflection measuring standard 10 to be coupled into optical fiber 30; i.e., to be focused onto the input face of the optical fiber.

Scanning reticle 21 is provided by a transparent carrier substrate of glass provided with a first transmission grating 23 on its side facing optical fiber 30 (top side) and a second transmission grating 24 on its side facing reflection measuring standard 10 (underside).

The beam incident on first transmission grating 23 and collimated by lens 22 is split by the first transmission grating into at least two diffracted sub-beams which, after being split, propagate further in scanning reticle 21 asymmetrically with respect to a normal to the scanning reticle. In the present exemplary embodiment, optical axis OA shown in FIG. 1 represents such a normal to the scanning reticle. First transmission grating 23 is configured as a blazed phase grating whose diffraction efficiency is maximum in the +1st and −2nd diffraction orders. Thus, these two diffraction orders produce the sub-beams that propagate further asymmetrically in the scanning beam path and are used to generate the displacement-dependent scanning signals and which travel different optical path lengths between splitting and recombination.

After passing through scanning reticle 21, the split sub-beams reach second transmission grating 24, which is provided on the side of scanning reticle 21 facing reflection measuring standard 10. Second transmission grating 24 causes the incident sub-beams from first transmission grating 23 to be deflected in such a way that after passage through second transmission grating 24, they propagate further symmetrically with respect to a normal to the scanning reticle between scanning reticle 21 and reflection measuring standard 10. Moreover, the deflection of the sub-beams by second transmission grating 24 is such that they are incident on reflection measuring standard 10 at the so-called "Littrow angle". As a result of the Littrow-angle incidence of the sub-beams on reflection measuring standard 10, the sub-beams are reflected back from reflection measuring standard 10 to scanning reticle 21 at the same angle at which they are incident on scanning reticle 21. Second transmission grating 24 is also in the form of a blazed phase grating. This phase grating is optimized for maximum diffraction efficiency in the +1st and −1st diffraction orders.

After the sub-beams are reflected back by reflection measuring standard 10, they pass through second transmission grating 24 on the underside of scanning reticle 21 again and propagate within scanning reticle 21 asymmetrically with respect to a normal to the scanning reticle again until they are recombined at first transmission grating 23. At first transmission grating 23 on the top side of scanning reticle 21, the sub-beams split at this transmission grating into +1st and −2nd diffraction orders are superimposed and interfered.

Then, the superimposed pair of sub-beams finally propagates along optical axis OA toward lens 22 and is coupled into optical fiber 30 by this lens.

In the present invention, as in DE 10 2007 024 349 A1, provision is made for wavelength-dependent coding of the phase-shifted scanning signals. This means that the phase-shifted scanning signals are generated from components of the illumination spectrum which have different wavelengths. What is important here is the asymmetrical beam path of the signal-generating sub-beams between splitting and recombination at the first transmission grating and the resulting different optical path lengths that the sub-beams travel between splitting and recombination. Accordingly, the asymmetrical beam path in this portion of the optical path causes a wavelength-dependent phase shift between the split sub-beams.

For wavelength-dependent coding of the phase-shifted scanning signals, it is further provided that first transmission grating 23 has a periodic phase pattern $\Delta p(x)$ along measuring direction x. This periodicity of first transmission grating 23 can be seen both in the cross-sectional view of first transmission grating 23 and in the schematic plan view of FIG. 2a. As can be seen, in the exemplary embodiment shown, first transmission grating 23 has a four-stage quantized configuration, four graduation regions having different phase-shifting effects being provided within one grating period $TP_{G1}$ of the first transmission grating and associated with four phase-shifted scanning signals having the phase relationships of 0°, 90°, 180°, 270°. In the view of FIG. 2a, the graduation regions having different phase-shifting effects are indicated by different hatchings. Of course, the first transmission grating could also be quantized in more than four stages, such as, for example, in eight stages.

The phase pattern $\Delta p(x)$ of first transmission grating 23 along measuring direction x can be described for the first exemplary embodiment as follows:

$$\Delta p(x) = \frac{1}{2\pi}\text{Arctan2}\left(\sin\left(\frac{2\pi i x}{TP_{G1}}\right)+\sin\left(\frac{2\pi i m x}{TP_{G1}}\right), \cos\left(\frac{2\pi i x}{TP_{G1}}\right)+\cos\left(\frac{2\pi i m x}{TPd_{G1}}\right)\right) \quad \text{(equation 1)}$$

m:=2, 0, −2, −3, . . . (further, asymmetrical diffraction order used in addition to the +1st diffraction order of the first transmission grating; above: m=−2)
$TP_{G1}$:=grating period of the first transmission grating Second transmission grating 24 on the underside of the scanning reticle is also quantized in four stages, as can be seen in the cross-sectional view of FIG. 1 and the plan view of FIG. 2b. Each grating period $TP_{G2}$ of second transmission grating 24 also includes four graduation regions having different phase-shifting effects, which are associated with the four phase-shifted scanning signals having the phase relationships of 0°, 90°, 180°, 270°.

For the specific dimensioning of an exemplary embodiment of the optical position-measuring device of the present invention, it is useful to consider the wave vectors or k-vectors of the involved beams, sub-beams and gratings, as will be illustrated hereinafter.

The k-vector of the resulting +1st order sub-beam at first transmission grating 23 is designated $k_1$. Accordingly, the resulting k-vector of the −2nd order sub-beam at the same transmission grating 23 is −2$k_1$. At second transmission grating 24 with the k-vector $k_2$, the addition of a k-vector $k_2=k_1/2$ results for the two sub-beams because of the symmetrization required there for the further optical path. Thus, the k-vectors $k_{beam}$ resulting for the two sub-beams propagating further toward reflection measuring standard 10 are obtained as $k_{beam}=3 k_1/2$ and $k_{beam}=-3 k_1/2$. Accordingly, the k-vectors $k_{beam}$ of the two sub-beams have the same magnitude in this portion of the optical path. In order to satisfy the Littrow condition, the magnitude of the k-vector $k_M$ of reflection measuring standard 10 must be selected to be twice the magnitude of the respective k-vectors $k_{beam}$; i.e., it must hold that $k_M=3k_1$.

As an alternative to the design of first transmission grating 23 described above, provision may be made for this grating to be optimized for other diffraction orders which propagate further asymmetrically in scanning reticle 21; i.e., not for the −2nd and +1st diffraction orders, but for other asymmetrical combinations diffraction orders, such as the 0-th and 1st diffraction orders or the +1st and −3rd diffraction orders, etc. For example, if in addition to the +1st diffraction order, a different diffraction order, hereinafter referred to as m-th diffraction order, is used in place of the −2nd diffraction order, then the following holds for the k-vector $k_2$ of second transmission grating 23 on the underside of scanning reticle 21:

$$k_2=(-mk_1-k_1)/2 \quad \text{(equation 2)}$$

$k_2$:=k-vector of the second transmission grating
$k_1$:=k-vector of the first transmission grating
m:=2, 0, −2, −3, . . . (further, asymmetrical diffraction order used in addition to the +1st diffraction order of the first transmission grating; above: m=−2)

Thus, the k-vectors $k_{beam}$ of the two sub-beams striking reflection measuring standard 10 are derived as:

$$k_{beam} = \pm\frac{(-mk_1+k_1)}{2} \quad \text{(equation 3)}$$

$k_{beam}$:=k-vectors of the two sub-beams striking the reflection measuring standard
$k_2$:=k-vector of the second transmission grating
$k_1$:=k-vector of the first transmission grating
m:=2, 0, −2, −3, . . . (further, asymmetrical diffraction order used in addition to the +1st diffraction order of the first transmission grating; above: m=−2)

Thus, the magnitude of the k-vectors $k_M$ of reflection measuring standard 10 is derived as:

$$k_M=2(-mk_1+k_1) \quad \text{(equation 4)}$$

$k_M$:=k-vector of the reflection measuring standard
$k_1$:=k-vector of the first transmission grating
m:=2, 0, −2, −3, . . . (further, asymmetrical diffraction order used in addition to the +1st diffraction order of the first transmission grating; above: m=−2)

When resolved with respect to $k_1$, equation 4 gives:

$$k_1 = -\frac{k_M}{m-1} \quad \text{(equation 4a)}$$

Accordingly, for grating periods $TP_{G1}$ and $TP_{G2}$ of the first and second transmission gratings, it holds that:

$$TP_{G1} = -(m-1)*TP_M \quad \text{(equation 4b)}$$
and

-continued $$T_{G2} = -\frac{2}{m+1} * T_{G1} \quad \text{(equation 4c)}$$

$k_M$:=k-vector of the reflection measuring standard
$k_1$:=k-vector of the first transmission grating
m:=2, 0, −2, −3, . . . (further, asymmetrical diffraction order used in addition to the +1st diffraction order of the first transmission grating; above: m=−2)

If grating period $TP_M$ of reflection measuring standard 10 is selected to be, for example, $TP_M$=4 µm, then, according to equation (4b) and with m=−2, the grating period $TP_{G1}$ of first transmission grating 23 has to be selected to be $TP_{G1}$=12 µm and, in accordance with equation (4c), grating period $TP_{G2}$ of second transmission grating 24 has to be selected to be $TP_{G2}$=24 µm.

As mentioned earlier herein, in addition to enabling scanning of reflection measuring standards having very small grating periods $TP_M$, it is another advantage of the device according to the present invention that the generation of the scanning signals is substantially independent of variations in the scanning distance between reflection measuring standard 10 and fiber optic scanning head 20. This is attributable to the fact that between second transmission grating 24 and reflection measuring standard 10, the sub-beams propagate symmetrically with respect to a normal to the scanning reticle. Since reflection measuring standard 10 is illuminated by two sub-beams with symmetrical effective diffraction orders, the path difference between the interfering sub-beams is independent of the scanning distance.

In the optical position-measuring device according to the present invention, the phase-shifted scanning signals are generated from different spectral components of the illumination spectrum. In order to make this possible for the desired number of phase-shifted scanning signals, certain considerations must be made with respect to the dimensioning of the system. First of all, the phase difference $\Delta p(\lambda_1, \lambda_2)$ of two signals from different wavelengths $\lambda_1$, $\lambda_2$ of the illumination spectrum, expressed in signal periods, is needed for this purpose. In the first exemplary embodiment, this relationship is derived as follows:

$$\Delta p(\lambda_1, \lambda_2) = 2d_{Ap} \cdot \quad \text{(equation 5)}$$
$$\left\{ \frac{n_{ref1}}{\lambda_1} \left[ \sqrt{1 - \left(\frac{\lambda_1}{TP_{G1}n_{ref1}}\right)^2} - \sqrt{1 - \left(\frac{m\lambda_1}{TP_{G1}n_{ref1}}\right)^2} \right] - \frac{nref2}{\lambda_2} \left[ \sqrt{1 - \left(\frac{\lambda_2}{d_{Ap}n_{ref1}}\right)^2} - \sqrt{1 - \left(\frac{m\lambda_2}{d_{Ap}n_{ref1}}\right)^2} \right] \right\}$$

$\lambda_1$, $\lambda_2$:=different wavelengths of the illumination spectrum
m:=2, 0, −2, −3, . . . (further, asymmetrical diffraction order used in addition to the +1st diffraction order of the first transmission grating; above: m=2)
$n_{ref1}$, $n_{ref2}$:=dispersion-dependent refractive indices of the scanning reticle at the wavelengths $\lambda_1$, $\lambda_2$
$TP_{G1}$:=grating period of the first transmission grating
$d_{Ap}$:=thickness of the scanning reticle In the following, a specific dimensioning example is given for the first embodiment of the optical position-measuring device according to the present invention.

The light source used here is an infrared LED having a central wavelength of 850 nm and a spectral width of 60 nm. If four phase-shifted scanning signals are to be obtained at the output, then one solution is to scan each of the four signal components from the entire wavelength range of the light source twice. Thus, eight signal components having a phase shift of 90° each must be obtained from the available spectral range of 60 nm of the light source. If sufficient resolution is available on the receiver side, the signal components can be scanned an even higher number of times. This leads to improved stability during a change in the spectrum of the light source, which may be caused, for example, by temperature effects. In order to generate the eight signal components by the provided double-scanning method, thickness $d_{Ap}$ of scanning reticle 21 and/or the grating parameters of the transmission gratings provided thereon must be suitably dimensioned such that a wavelength shift of 30 nm will cause a phase shift of 1 (360°). In the specific embodiment, quartz is used as the material for scanning reticle 23 ($n_{ref}\approx1.452$). Further assumptions include the above-mentioned grating periods $TP_M$=4 µm, $TP_{G1}$=12 µm, $TP_{G2}$=24 µm for reflection measuring standard 10 and first and second transmission gratings 23, 24. When the above equation (5) is resolved for thickness $d_{Ap}$ of scanning reticle 21, the required thickness $d_{Ap}$ resulting for scanning reticle 21 is $d_{Ap}$=2.28 mm. Accordingly, in the position-measuring device of the present invention, thickness $d_{Ap}$ of scanning reticle 21 and/or the grating parameters of the transmission gratings provided thereon is/are dimensioned such that the corresponding phase shift will result for each change in wavelength in accordance with equation (5).

In addition to the above-described components of the optical position-measuring device of the present invention, FIG. 1 further shows detector device 50, which is disposed at the end of optical fiber 30 facing away from the measuring standard and used for detecting the wavelength-coded, phase-shifted scanning signals. To this end, detector device 50 includes a schematically indicated splitting device 51 for wavelength-dependent separation of the superimposed sub-beams which are transmitted through optical fiber 30 to detector device 50.

In the present example, the splitting device 51 is a dispersive element in the form of a diffraction grating. A lens 52 disposed downstream of splitting device 51 focuses the light onto a structured photodetector 53, which is here composed of eight individual detector elements. The imaged light of a certain wavelength forms a circle in the focal plane, the diameter of which is given by product of the core diameter of optical fiber 30 and the ratio of the focal lengths of lens 52 and input coupling lens 43. Therefore, the dispersion of splitting device 51 must be sufficiently high in order that the circular images of the fiber end are spatially separated, and thus can be detected in a resolved manner. In the present exemplary embodiment, the phase shift is assumed to be 30 nm/360°.

If, for example, four scanning signals are generated which are 90° phase-shifted relative to one another, then, accordingly, a spectral resolution of 7.5 nm is required. In this connection, each scanning signal can be scanned multiple times with a phase shift of 360°, respectively. In this way, the full spectrum of the light source can be used, while, for example, a temperature-induced wavelength shift has only minor effects on the amplitudes of the generated scanning signals.

Further components for signal processing may be additionally disposed in detector device 50. These include, for example, amplifier components, A/D converters, etc., via which the scanning signals are further processed and conditioned electronically before they are transmitted to subsequent electronics for further processing.

In order to achieve sufficient resolution with an evaluation unit of small size, it is also possible to use a plurality of diffraction gratings arranged in series in the optical path as splitting device 51. A high diffraction efficiency can be achieved for the diffraction gratings by illuminating them at approximately the Littrow angle. Under this condition, the focal length f of input coupling lens 43 is preferably to be dimensioned as follows $$f = \frac{D_f}{N * \Delta\lambda}\sqrt{d^2 - \left(\frac{\lambda}{2}\right)^2} \quad \text{(equation 6)}$$

where
$\lambda$:=mean wavelength
d:=grating constant of the diffraction grating
d:=diameter of the fiber end
N:=number of diffraction gratings used
$\Delta\lambda$:=required wavelength resolution.

Another advantage is a reduction of the DC light component that enters the detection channel by reflection of the input light at the fiber end. This can be achieved by coating the fiber end with an antireflection coating. Alternatively or additionally, the fiber end may be angle-polished to prevent light reflected during incoupling from entering the detection channel.

Alternatively or additionally, the unmodulated spectrum may also be measured in the device according to the present invention. To this end, the light reflected at the angled fiber end may be deflected, for example, by a prism or a diffractive element between the output coupling end of the fiber and the input coupling lens in such a way that the reflected light is emitted from a virtual point spaced from the fiber end. In this way, the unmodulated spectrum is obtained adjacent to and spaced from the modulated spectrum in the plane of the circuit board of the detector element and is detectable by additional detector elements. The information so obtained can be used to correct signal errors caused by a change in the illumination spectrum.

Figure 3:
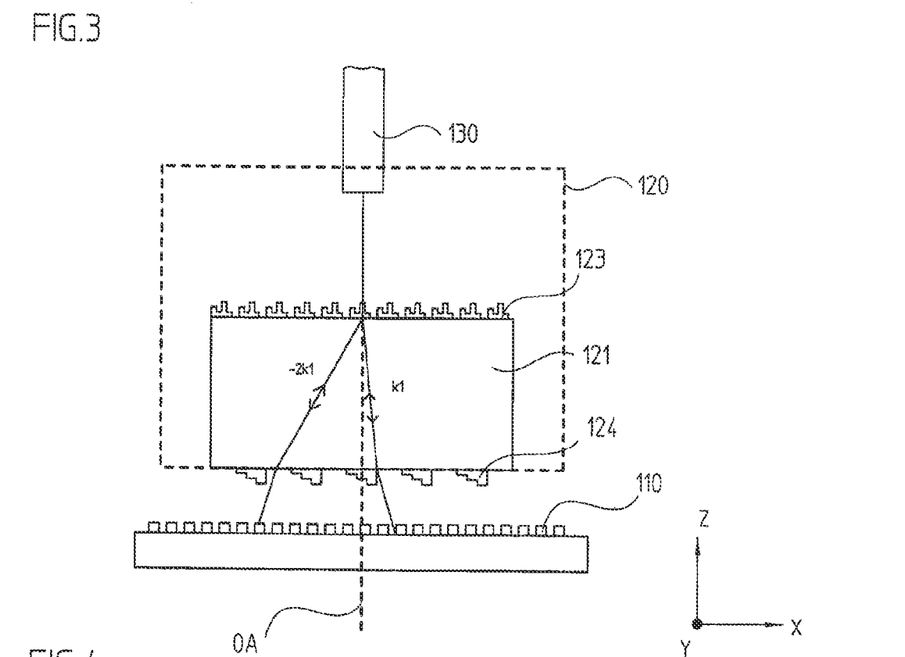
FIG. 3 is a schematic partial view of a second exemplary embodiment of the position-measuring device according to the present invention.

A second exemplary embodiment of the inventive optical position-measuring device, which is slightly modified from the first exemplary embodiment, is partially illustrated in FIG. 3, which shows only the components at the measurement location; i.e., fiber optic scanning head 120 and reflection measuring standard 110. The various components at the end of optical fiber 130 facing away from the measuring standard are configured identically to the first exemplary embodiment. In the following, only the relevant differences from the first exemplary embodiment will be described.

In the second exemplary embodiment, fiber optic scanning head 120 does not include a separate lens between optical fiber 130 and first transmission grating 123 on the top side of scanning reticle 121. Rather, the optical functionality of this lens is additionally incorporated into first transmission grating 123. This means that, in addition to the above-described optical functions, first transmission grating 123 also has a collimating effect on the incident sub-beam from optical fiber 120. The superimposed sub-beams propagating in the opposite direction are coupled via the first transmission grating into optical fiber 130. To this end, they are focused onto the corresponding input face of the optical fiber. This results in a fiber optic scanning head 120 which is even more compact than that in the first exemplary embodiment. In addition, the effort for adjusting a separate lens during the manufacture of the inventive device is eliminated.

Figure 4:
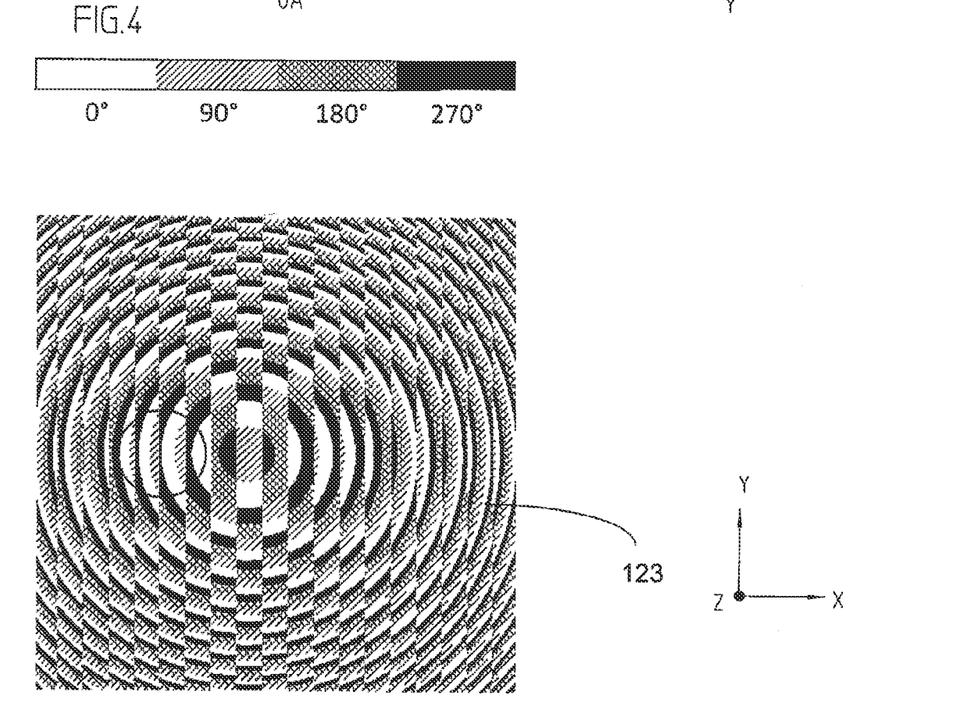
FIG. 4 shows in schematic form the phase pattern of the first transmission grating on the top side of the scanning reticle of the second exemplary embodiment.

FIG. 4 shows a top view of the then resulting phase pattern of the first transmission grating 123 having the additional functionality.

With regard to the generation of phase-shifted scanning signals and for further details, reference is made to the description of the first exemplary embodiment.

Figure 5:
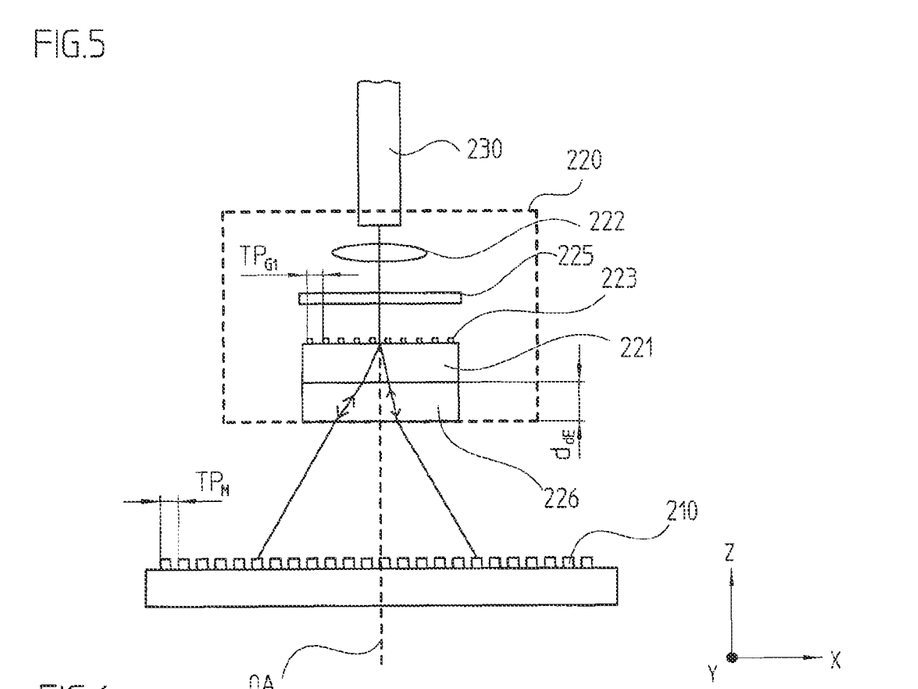
FIG. 5 is a schematic partial view of a third exemplary embodiment of the position-measuring device according to the present invention.
Figure 6:
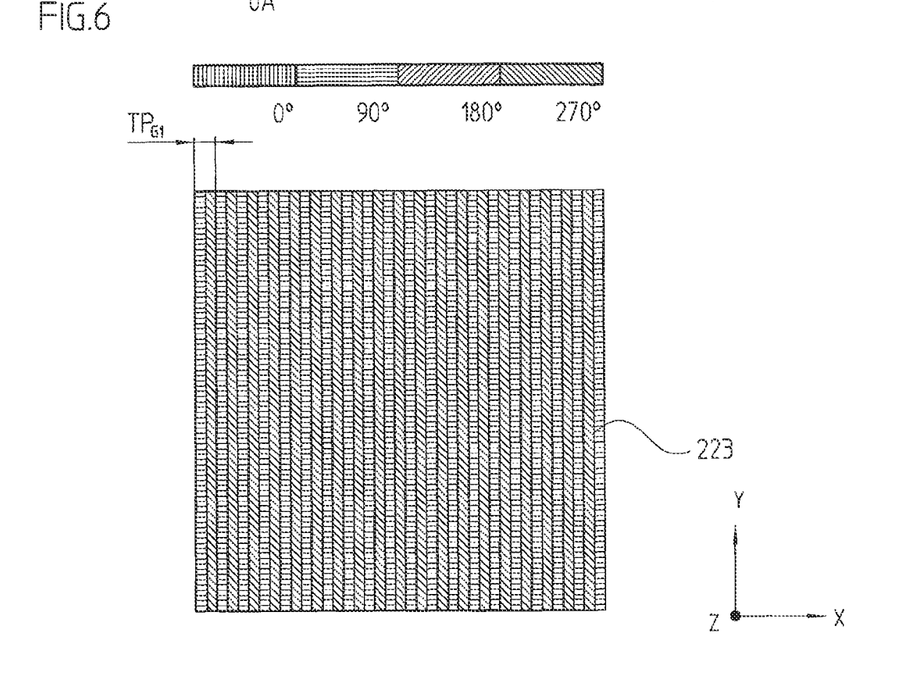
FIG. 6 shows in schematic form the phase pattern of the first transmission grating on the top side of the scanning reticle of the third exemplary embodiment.

A third exemplary embodiment of the optical position-measuring device according to the present invention is shown in FIGS. 5 and 6. The following description of the third exemplary embodiment will focus primarily on the relevant differences from the first exemplary embodiments.

FIG. 5 also shows only the region of the measurement location, while FIG. 6 illustrates, in schematic form, the phase pattern of the first transmission grating. The coupling of light into optical fiber 230 and the detection of the superimposed sub-beams occur analogously to the exemplary embodiments described hereinbefore.

As in the first exemplary embodiment, the beam exiting optical fiber 230 in fiber optic scanning head 220 is collimated by a lens 222 on its way to reflection measuring standard 210 along optical axis OA. The collimated beam then passes through a polarizer 225 which linearly polarizes the beam, the polarization direction being oriented in measuring direction x. Then, the linearly polarized beam strikes scanning reticle 221 and, more specifically, a first transmission grating 223 provided on the side of scanning reticle 221 facing optical fiber 230. In contrast to the two preceding variants, first transmission grating 223 splits the incident beams into +1st and −1st order sub-beams. First transmission grating 223 is in the form of a phase grating and has a grating period $TP_{G1}$ equal to half the grating period $TP_M$ of reflection measuring standard 210.

The split sub-beams then propagate through scanning reticle 221 and enter a birefringent element 226 provided on the side of scanning reticle 221 facing reflection measuring standard 210. In birefringent element 226 of scanning reticle 221, the split sub-beams then propagate further asymmetrically. This is caused by the chosen orientation of birefringent element 226 in such a way that the propagation of the ordinary beams in birefringent element 226 is suppressed due to the linear polarization of the sub-beams in measuring direction x. Furthermore, the polarization ellipsoids of birefringent element 226 are oriented at an angle not equal to 0° and not equal to 90° with respect to a normal to the scanning reticle. In this way, it is achieved that the refractive indices of the two extraordinary beams which result from the two 1st diffraction orders of first transmission grating 223 are different. This is due to the different relative angles of the main axes of the birefringent element 225 with respect to the propagation direction of the two sub-beams.

For the specific dimensioning of such an embodiment of the optical position-measuring device of the present invention, it is required again to know the phase difference $\Delta p(\lambda_1, \lambda_2)$ of two signals based on different wavelengths $\lambda_1, \lambda_2$, expressed in signal periods. In the present exemplary embodiment, this phase difference $\Delta p(\lambda_1, \lambda_2)$ is proportional to the thickness $d_{dE}$ of birefringent element 226 and is derived as follows:

$$\Delta p(\lambda_1, \lambda_2) = \quad \text{(equation 7)}$$
$$d_{dE} \cdot \left\{ \frac{1}{\lambda_1} \left[ n_r(\lambda_1, \beta_1(\lambda_1)) \sqrt{1 - \left(\frac{\lambda_1}{TP_{G1} n_r(\lambda_1, \beta_1(\lambda_1))}\right)^2} - \right. \right.$$
$$\left. n_r(\lambda_1, \beta_2(\lambda_1)) \sqrt{1 - \left(\frac{\lambda_1}{TP_{G1} n_r(\lambda_1, \beta_2(\lambda_1))}\right)^2} \right] -$$

-continued $$\frac{1}{\lambda_2}\left[n_r(\lambda_2,\beta_1(\lambda_2))\sqrt{1-\left(\frac{\lambda_2}{TP_{G1}n_r(\lambda_2,\beta_1(\lambda_2))}\right)^2}-\right.$$

$$\left.n_r(\lambda_2,\beta_2(\lambda_2))\sqrt{1-\left(\frac{\lambda_2}{TP_{G1}n_r(\lambda_2,\beta_2(\lambda_2))}\right)^2}\right]\right\}$$

$\lambda_1, \lambda_2$:=different wavelengths of the illumination spectrum
$d_{dE}$:=thickness of the birefringent element
$\beta_1, \beta_2$:=illumination angle at which the two split sub-beams are incident on the birefringent element with respect to a surface normal
$TP_{G1}$:=grating period of the first transmission grating
$n_r$:=refractive index of the birefringent element, depending on the wavelength and the illumination direction of the extraordinary beam.

Here, refractive index $n_r$ depends both on the particular wavelength $\lambda_1, \lambda_2$ and on the respective illumination direction $\beta_1$ or $\beta_2$. The two different illumination directions $\beta_1$ and $\beta_2$ result from the two diffraction orders produced by first transmission grating 223. Since refractive index $n_r$ is direction-dependent, $\beta_1$ and $\beta_2$ are numerically calculated from the following formula for birefringent media by searching zeros:

$$0 = \mp\frac{\lambda_i}{TP_{G1}} + n_r(\gamma-\beta_{1,2})\sin\beta_{1,2} \qquad \text{(equation 8)}$$

$\lambda_i$:=different wavelengths of the illumination spectrum
$n_r$:=direction-dependent refractive index of the birefringent element, depending on the wavelength and the illumination direction of the extraordinary beam.
$\beta_{1,2}$:=angle at which the two split sub-beams propagate through the birefringent element with respect to a surface normal
$\gamma$:=orientation angle of the material of the birefringent element with respect to a surface normal In this connection, direction-dependent refractive index $n_r$ is given by:

$$n_r(\theta) = \frac{n_o n_e}{\sqrt{n_o^2\sin^2(\theta) + n_e^2\cos^2(\theta)}} \qquad \text{(equation 9)}$$

$n_r$:=direction-dependent refractive index of the birefringent element, depending on the wavelength and the illumination direction of the extraordinary beam.
$n_o$:=refractive index of the ordinary beam
$n_e$:=refractive index of the extraordinary beam
$\Theta$:=angle between beam direction $\beta_1, \beta_2$ and orientation angle $\gamma$ of the birefringent element.

The refractive indices $n_0$, $n_e$ are to be determined from the dispersion formula of the respective birefringent material for the respective wavelength.

In the following, a specific dimensioning example is given for the third embodiment of the position-measuring device according to the present invention.

Again, a light source is used which has a central wavelength of 850 nm and a spectral width of 60 nm. Calcite is used as the material for birefringent element 226.

The required thickness $d_{dE}$ of birefringent element 226 generally decreases with decreasing grating period $TP_M$ of reflection measuring standard 210, because the diffraction angles of the two transmitted +/−1st diffraction orders in birefringent element 226 differ to a greater extent. Therefore, the grating period $TP_{G1}$ of first transmission grating 223 is hereinafter assumed to be $TP_{G1}$=4 µm. The resulting grating period $TP_M$ of reflection measuring standard 210 is $TP_M$=2 µm and the resulting signal period of the scanning signals is 1 µm. Also assumed is an orientation angle of γ=45°. If, again, a phase shift of 360° per 30 nm is to be achieved, then the thickness $d_{dE}$ of birefringent element 226 must be $d_{dE}$=3.71 mm.

By using AgGaSe$_2$ (silver gallium selenide) as the birefringent material, it is possible to achieve an even more compact design and a smaller thickness $d_{dE}$ for birefringent element 226. Under the same conditions as those described above, the resulting thickness of birefringent element 226 is $d_{dE}$=0.47 mm.

Figure 7:
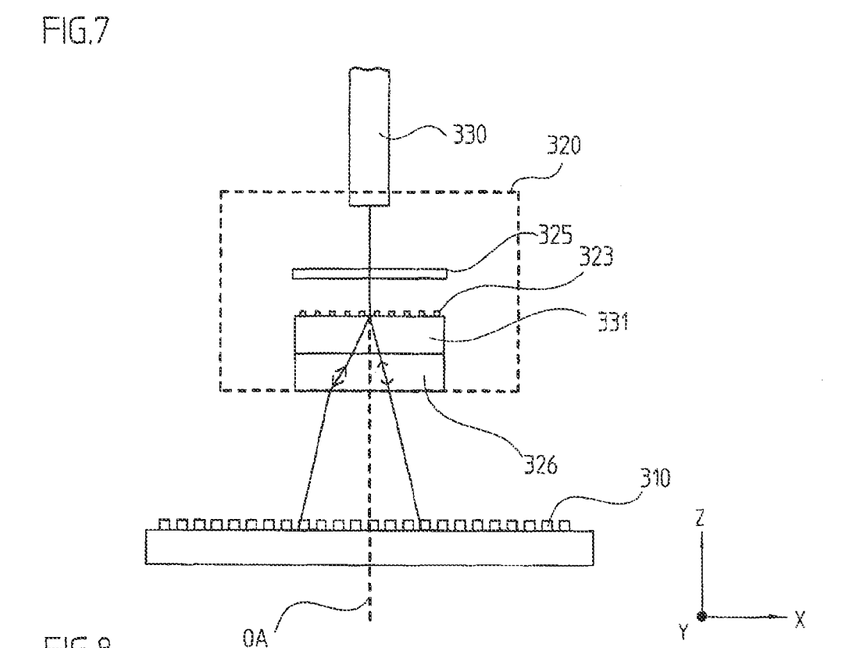
FIG. 7 is a schematic partial view of a fourth exemplary embodiment of the position-measuring device according to the present invention.

Finally, a fourth exemplary embodiment of the optical position-measuring device according to the present invention will be described with reference to FIGS. 7 and 8.

The fourth exemplary embodiment is based on the third embodiment described above and differs therefrom substantially only in that the optical functionality of lens 222 is now incorporated into first transmission grating 323 on the top side scanning reticle 321, such as in the second exemplary embodiment. In addition to the beam-splitting functions, first transmission grating 323 also has a collimating effect on the incident sub-beam from optical fiber 320. The superimposed sub-beams propagating in the opposite direction are coupled via the first transmission grating into optical fiber 330. To this end, they are focused onto the corresponding input face of the optical fiber. The resulting fiber optic scanning head 320 is even more compact than that of the third exemplary embodiment.

Figure 8:
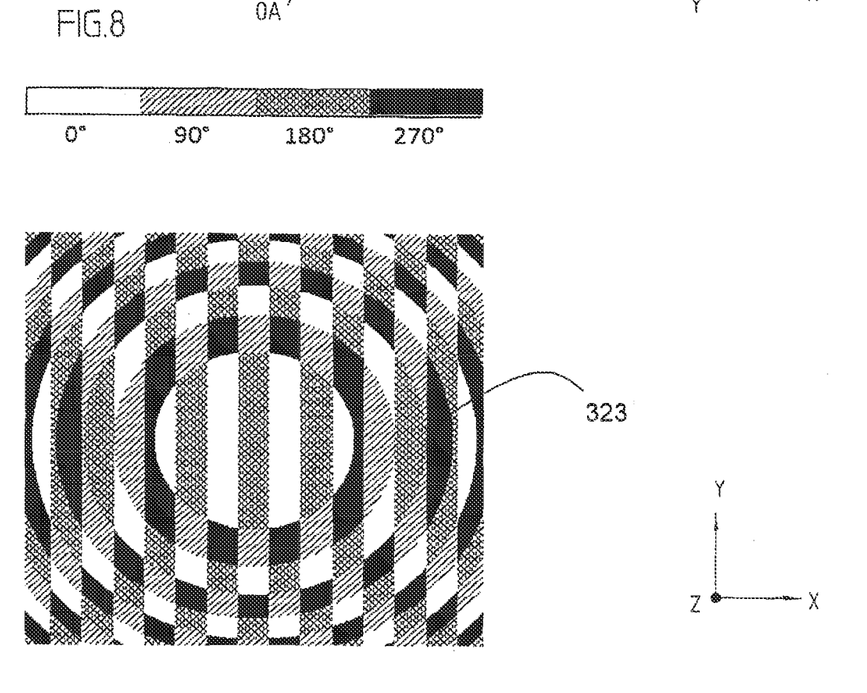
FIG. 8 shows in schematic form the phase pattern of the first transmission grating on the top side of the scanning reticle of the fourth exemplary embodiment.

FIG. 8 shows a top view of the then resulting phase pattern of the first transmission grating 323 having the additional functionality.

With regard to the generation of phase-shifted scanning signals and for further details, reference is made to the description of the third exemplary embodiment and the other exemplary embodiments.

In addition to the embodiments described herein, the present invention may, of course, be modified in other ways.

As mentioned in connection with the description of the second exemplary embodiment of a suitable scanning reticle, it may be required to use a composite light source or light source unit composed of a plurality of individual light sources having different individual wavelengths in place of a single broadband light source. Depending on the specific embodiment, laser diodes, VCSELs, LEDS, OLEDs, etc. may be used as the light source. The light from these different light sources can be combined by dichroic mirrors or a suitable dispersive element and jointly coupled into the optical fiber.

In addition to implementing a system with four scanning signals which are 90° phase-shifted relative to one another, it is, of course, also possible within the scope of the present invention to provide a variant in which three scanning signals are generated which are 120° phase-shifted relative to one another. In this case too, as in the four-phase system explained above, it is possible to implement multiple scanning etc.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical position-measuring device, comprising:
an optical fiber;
a fiber optic scanning head having a scanning reticle disposed therein before a measuring standard end of the optical fiber; and
a reflection measuring standard movable relative to the fiber optic scanning head in at least one measuring direction,
wherein the optical position-measuring device is configured to generate a plurality of phase-shifted scanning signals regarding a position of the fiber optic scanning head relative to the reflection measuring standard, the phase-shifted scanning signals being coded in a wavelength-dependent manner, and
wherein the scanning reticle is configured such that:
a beam incident on the scanning reticle is split into at least two sub-beams which strike the reflection measuring standard and are subsequently recombined to interfere with each other so as to generate the phase-shifted scanning signals, and
the sub-beams travel different optical path lengths between splitting and recombination,
wherein the scanning reticle is configured as a plate-like transparent substrate, wherein a side of the scanning reticle facing the optical fiber has a first transmission grating configured to split the beam incident thereon into at least two diffracted sub-beams which propagate further asymmetrically with respect to a normal to the scanning reticle, and wherein a side of the scanning reticle facing the reflection measuring standard has a second transmission grating configured to cause the sub-beams incident thereon from the first transmission grating to be deflected in such a way that the sub-beams propagate symmetrically relative to each other with respect to the normal to the scanning reticle between the scanning reticle and the reflection measuring standard and strike the reflection measuring standard at its Littrow angle.

2. The optical position-measuring device as recited in claim 1, wherein the scanning reticle is further configured such that the at least two sub-beams propagate symmetrically with respect to the normal to the scanning reticle between the scanning reticle and the reflection measuring standard and strike the reflection measuring standard at its Littrow angle.

3. The optical position-measuring device as recited in claim 2, wherein the diffraction efficiency of the reflection measuring standard is maximum in the +/−1st diffraction orders.

4. The optical position-measuring device as recited in claim 1, wherein the optical fiber is in a form of a multi-mode fiber configured to transmit both the beam used for illumination toward the fiber optic scanning head and the recombined sub-beams away from the fiber optic scanning head.

5. The optical position-measuring device as recited in claim 1, further comprising at least one light source that is a spectrally broadband light source or a plurality of light sources emitting radiation of different wavelengths disposed at an end of the optical fiber facing away from the measuring standard, and an input coupling device configured to couple radiation from the at least one light source into the optical fiber as an illumination beam.

6. The optical position-measuring device as recited in claim 5, further comprising a detector device disposed at the end of the optical fiber facing away from the measuring standard, the detector device comprising:
a splitting device configured to provide a wavelength-dependent separation of the recombined sub-beams; and
a plurality of optoelectronic detector elements configured to receive the separated sub-beams and convert the sub-beams into phase-shifted electrical scanning signals.

7. The optical position-measuring device as recited in claim 1, wherein the first transmission grating and the second transmission grating are each configured as a blazed phase grating.

8. The optical position-measuring device as recited in claim 7, wherein the first transmission grating and the second transmission grating have a periodic phase pattern along the measuring direction.

9. The optical position-measuring device as recited in claim 1, wherein the first transmission grating is further configured to produce a collimating effect on the beam incident thereon.

10. The optical position-measuring device as recited in claim 1, wherein at least one of a thickness of the scanning reticle and grating parameters of the transmission gratings provided thereon are such that multiple scanning of signal components that contribute to the phase-shifted scanning signals is enabled.

11. The optical position-measuring device as recited in claim 6, wherein the splitting devices include a plurality of diffraction gratings arranged in series in an optical path.

12. The optical position-measuring device as recited in claim 5, wherein an end of the optical fiber facing away from the measuring standard has an antireflection coating or is angle-polished.

13. An optical position-measuring device, comprising:
an optical fiber;
a fiber optic scanning head having a scanning reticle disposed therein before a measuring standard end of the optical fiber; and
a reflection measuring standard movable relative to the fiber optic scanning head in at least one measuring direction,
wherein the optical position-measuring device is configured to generate a plurality of phase-shifted scanning signals regarding a position of the fiber optic scanning head relative to the reflection measuring standard, the phase-shifted scanning signals being coded in a wavelength-dependent manner, and wherein the scanning reticle is configured such that:
a beam incident on the scanning reticle is split into at least two sub-beams which strike the reflection measuring standard and are subsequently recombined to interfere with each other so as to generate the phase-shifted scanning signals, and
the sub-beams travel different optical path lengths between splitting and recombination,
wherein a linearly polarized beam is incident on the scanning reticle, wherein a side of the scanning reticle facing the optical fiber has a first transmission grating configured to split the beam incident thereon into at least two diffracted sub-beams and to produce a collimating effect on the beam incident thereon, and wherein a side of the scanning reticle facing the reflection measuring standard has a birefringent element, in which the split sub-beams propagate further asymmetrically with respect to a normal to the scanning reticle and, after exiting the scanning reticle, propagate symmetrically relative to each other with respect to the normal to the scanning reticle between the scanning reticle and the reflection measuring standard and strike the reflection measuring standard at the Littrow angle.

14. The optical position-measuring device as recited in claim 13, wherein the scanning reticle is further configured such that the at least two sub-beams propagate symmetrically with respect to the normal to the scanning reticle between the scanning reticle and the reflection measuring standard and strike the reflection measuring standard at its Littrow angle.

15. The optical position-measuring device as recited in claim 14, wherein the diffraction efficiency of the reflection measuring standard is maximum in the +/−1st diffraction orders.

16. The optical position-measuring device as recited in claim 13, wherein the optical fiber is in a form of a multi-mode fiber configured to transmit both the beam used for illumination toward the fiber optic scanning head and the recombined sub-beams away from the fiber optic scanning head.

17. The optical position-measuring device as recited in claim 13, further comprising at least one light source that is a spectrally broadband light source or a plurality of light sources emitting radiation of different wavelengths disposed at an end of the optical fiber facing away from the measuring standard, and an input coupling device configured to couple radiation from the at least one light source into the optical fiber as an illumination beam.

18. The optical position-measuring device as recited in claim 17, further comprising a detector device disposed at the end of the optical fiber facing away from the measuring standard, the detector device comprising:
a splitting device configured to provide a wavelength-dependent separation of the recombined sub-beams; and
a plurality of optoelectronic detector elements configured to receive the separated sub-beams and convert the sub-beams into phase-shifted electrical scanning signals.

19. The optical position-measuring device as recited in claim 13, wherein a thickness of the birefringent element is such that multiple scanning of signal components that contribute to the phase-shifted scanning signals is enabled.

20. The optical position-measuring device as recited in claim 18, wherein the splitting devices include a plurality of diffraction gratings arranged in series in an optical path.

21. The optical position-measuring device as recited in claim 17, wherein an end of the optical fiber facing away from the measuring standard has an antireflection coating or is angle-polished.

* * * * *